Figure 1:
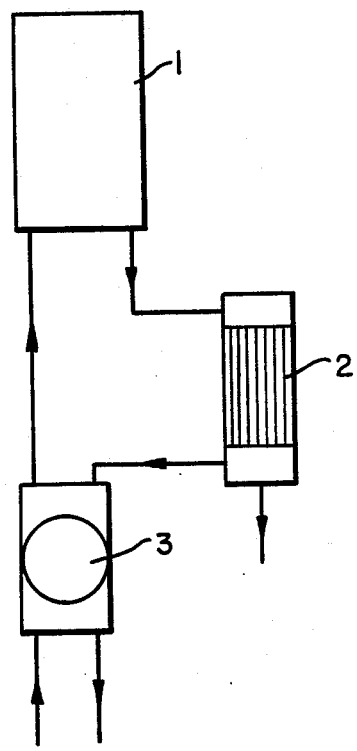

United States Patent [19]

Tiberg

[11] Patent Number: 4,918,916
[45] Date of Patent: Apr. 24, 1990

[54] METHOD FOR TRANSFERRING WATER FROM COMBUSTION GASES TO AIR OF COMBUSTION

[76] Inventor: Lars Tiberg, Vad 4201, S-770 20 Söderbärke, Sweden

[21] Appl. No.: 236,368

[22] Filed: Aug. 22, 1988

[30] Foreign Application Priority Data

Aug. 28, 1987 [SE] Sweden .............................. 87033387

[51] Int. Cl.[5] .............................................. F01N 3/02
[52] U.S. Cl. ........................................ 60/273; 60/309; 123/25 A
[58] Field of Search ................. 60/273, 309; 123/25 A

[56] References Cited

U.S. PATENT DOCUMENTS

| | | | |
|---|---|---|---|
| 2,403,774 | 7/1946 | Whitty ................................... | 60/309 |
| 3,747,347 | 7/1973 | Ciraolo ................................. | 60/309 |
| 3,983,882 | 10/1976 | Billings .............................. | 123/25 A |
| 3,996,902 | 12/1976 | Ri ....................................... | 123/25 B |
| 4,440,116 | 4/1984 | Stevenson .......................... | 123/25 A |

FOREIGN PATENT DOCUMENTS 0122579 10/1984 European Pat. Off. .

Primary Examiner—Douglas Hart
Attorney, Agent, or Firm—Pasquale A. Razzano

[57] ABSTRACT

This invention relates to a method of transferring water from gases generated by combustion to air of combustion when burning hydrogen-containing or moist fuels, in which the combustion gases are cooled to temperatures beneath or in the proximity of their dew point temperature. Subsequent to this initial cooling, the gases are further cooled by means of a regenerative exchange of heat with the incoming air of combustion, such that water vapor is condensed on the combustion gas side and revaporized on the air of combustion side, both heat and water vapor being transferred from the combustion gases to the air of combustion. In accordance with one preferred embodiment of the invention, the method is effected in a combustion engine, such as a diesel engine or Otto-cycle engine.

3 Claims, 1 Drawing Sheet

METHOD FOR TRANSFERRING WATER FROM COMBUSTION GASES TO AIR OF COMBUSTION

The present invention relates to a method for transferring water from combustion gases to air of combustion in the combustion of hydrogenous or moisture-containing fuels, in which the combustion gases are cooled to temperatures beneath or close to their dew point for the purpose of condensing the water contained in the gases.

When fuels which contain hydrogen and/or water are burned, water vapour will be generated in the resultant gases of combustion. Cooling of these gases to temperatures beneath their respective dew points will result in partial condensation of the water vapour present, therewith enabling the heat of condensation to be used for useful purposes. The possibility of utilizing the energy of condensation is often restricted, however, because it is not possible to utilize heat of such low temperature as that required for condensation. The combustion gases may also be cooled by heat exchange with air of combustion. When the gases are cooled through heat transfer with return water, however, and the gases have a temperature, in the vicinity of their dew point temperature, the decrease in combustion gas temperature will be small when exchanging heat with the air of combustion, since in addition to sensible heat the gases also contain latent heat (heat of condensation).

The object of the present invention is to improve the heat yield from a combustion process and to reduce the generation of nitrogen oxides in said process.

The inventive method is characterized by, subsequent to said initial cooling of the combustion gases, further cooling the gases by regenerative heat exchange with the incoming air of combustion, so that water vapour is condensed on the combustion gas side and revapourized on the air of combustion side, both heat and water vapour being transferred from the combustion gases to the air of combustion.

Figure 2:
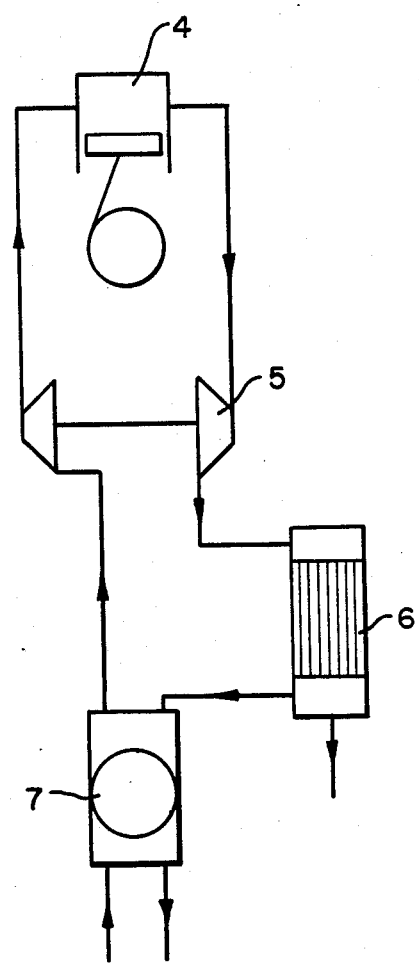

The invention will now be described in more detail with reference to the accompanying drawings, in which FIG. 1 illustrates a combustion plant in the form of a central heating furnace in which the inventive method is applied, and FIG. 2 illustrates a combustion plant in the form of an internal combustion engine in which the inventive method can be applied.

The arrangement illustrated in FIG. 1 includes a central heating furnace 1 from which combustion gases, or flue gases, are passed to a first cooler 2, in which the gases are cooled to a temperature beneath or close to their dew point temperature. The gases are then passed from the cooler 2 to rotatable regenerative heat exchanger 3, in which the gases are further cooled, so that water vapour is condensed on the flue gas side of the heat exchanger 3 and revapourized on the air of combustion side thereof. The heat and water vapour thus transferred from the combustion gases to the air of combustion is then delivered to the furnace 1 together with the air of combustion.

The rotatable regenerative heat exchanger 3 may comprise a hygroscopic rotor in which heat and moisture are transferred simultaneously from the combustion gases to the air of combustion. In this case, the air is preferably preheated and then subjected to an enthalpic heat-exchange process with the combustion gases. As a result of this process, the air will not be saturated with moisture and the flue gases will be dry, e.g. conditions which might be advantageous in subsequent process stages on the flue gas side of the system. The rotor itself is dry running. The moisture transfer is effected with the aid of hygroscopic means on the rotor. The heat exchanger 3 may alternatively comprise a rotor which is not hygroscopic, in which case cold air of combustion is subjected to a direct exchange of heat with hot saturated combustion gases. The rotor becomes wet on the gas side and moisture is passed from the rotor to the air of combustion side, where the moisture is partially vapourized. As a result of this process, the air of combustion will be fully saturated with moisture, as will the combustion gases.

FIG. 2 illustrates schematically another arrangement in which the inventive method can be applied. In the case of this embodiment combustion is effected in an internal combustion engine 4, e.g. a diesel engine, equipped with a turbo-charger 5. The gases of combustion, are passed from the turbo-charger to a first gas cooler 6, in which the gases are cooled to a temperature beneath or close to their dew point temperature. The gases are then passed from the cooler 6 to a rotating, regenerative heat exchanger 7, in which water vapour condenses on the combustion gas side and is revapourized on the air of combustion side. Thus, both heat and water vapour are passed from the gases to the air of combustion. As with the FIG. 1 embodiment, the heat exchanger 7 may be either hygroscopic or non-hygroscopic. In accordance with the invention, further moisture is added to the air of combustion at the same time as the air is preheated, thereby enabling considerably more energy to be transferred from the gases to the air of combustion. Because of this increase in the water-vapour content of the air of combustion, the combustion temperature will be lower than when the moisture content of the combustion air is not increased. When the fuel is very moist, the air can be superheated prior to combustion, in order to compensate for falls in temperature. The combustion gases generated when combusting with air which has an elevated moisture content will contain more water vapour than those gases that are generated when combusting with air whose moisture content has not been elevated, therewith enabling more energy to be recovered when effecting an exchange of heat with return water for instance. This means in principle that energy can be taken from the combustion gases at a low temperature, through heat exchange with air of combustion having an elevated moisture content. This energy is then recovered at higher temperature, by condensing water vapour in an exchange of heat with return water for instance. The effect achieved in this case is the same as that achieved when a heat pump is used to upgrade the energy.

In the case of known plants or arrangements of the aforementioned kind, the air of combustion is moistened and the combustion gases are cooled with the aid of scrubbers. When practicing the method according to the invention, the exchange of heat between the air of combustion and the combustion gases is effected with the aid of a rotating or regenerative heat exchanger, the resultant effect being novel and surprising and not previously known.

The addition of water vapour to the air of combustion in accordance with the invention also has a beneficial effect when wishing to reduce the amount of nitrogen oxides contained by the combustion gases. This is particularly true in the case of internal combustion engines, such as diesel engines, Otto-cycle engines, and also gas turbines. The transfer of water vapour from the combustion gases to the air of combustion obviates the need to supply water to the system from an external source.

I claim:

1. A method for transferring water from combustion gases to air-of-combustion when combusting hydrogen containing or moist fuels, comprising cooling the combustion gases to a temperature beneath or in proximity of their dew point temperature, and then further cooling the gases in a regenerative heat exchanger, having a combustion gas side and an air-of-combustion side, with the incoming air-of-combustion, so that water vapor is condensed on the combustion gas side and revaporized on the air-of-combustion side, and transferring both heat and water vapor from the combustion gas side to the air-of-combustion side.

2. A method according to claim 1, wherein the process of combustion is in an internal combustion engine.

3. A method according to claim 1, wherein the process of combustion is in a diesel engine.

* * * * *